United States Patent
Ylirinne

(10) Patent No.: US 11,552,820 B2
(45) Date of Patent: Jan. 10, 2023

(54) PRIORITIZED SERIAL COMMUNICATION

(71) Applicant: Vacon Oy, Vaasa (FI)

(72) Inventor: Petri Ylirinne, Vaasa (FI)

(73) Assignee: Vacon Oy, Vaasa (FI)

( * ) Notice: Subject to any disclaimer, the term of this patent is extended or adjusted under 35 U.S.C. 154(b) by 0 days.

(21) Appl. No.: 16/468,411

(22) PCT Filed: Dec. 21, 2016

(86) PCT No.: PCT/EP2016/082128
§ 371 (c)(1),
(2) Date: Jun. 11, 2019

(87) PCT Pub. No.: WO2018/113945
PCT Pub. Date: Jun. 28, 2018

(65) Prior Publication Data
US 2020/0014553 A1    Jan. 9, 2020

(51) Int. Cl.
*H04L 12/40*    (2006.01)
*H02M 7/5387*    (2007.01)
(Continued)

(52) U.S. Cl.
CPC .. *H04L 12/40163* (2013.01); *H02M 7/53873* (2013.01); *H04L 9/40* (2022.05);
(Continued)

(58) Field of Classification Search
CPC .......... H04Q 2213/13174; H04Q 2213/13296; H04L 12/40143
See application file for complete search history.

(56) References Cited

U.S. PATENT DOCUMENTS 5,323,385 A    6/1994  Jurewicz et al.
6,542,947 B1 *  4/2003  Buhring .............. H04L 12/4135
                                                  710/105
(Continued)

FOREIGN PATENT DOCUMENTS

CN    1381968 A    11/2002
CN    101213798 A   7/2008
(Continued)

OTHER PUBLICATIONS

IEEE: Priority Interrupts of Duty Cycled Communications in Wireless Sensor Networks; Tony O'Donovan, Jonathan Benson, Utz Roedig, Cormac J. Sreenan; Mobile and Internet Systems Laboratory, Dept. of Computer Science, University College Cork, Ireland. InfoLab21, Lancaster University, UK. 2008. (Year: 2008).*

(Continued)

*Primary Examiner* — Mohammed S Chowdhury
(74) *Attorney, Agent, or Firm* — McCormick, Paulding & Huber PLLC

(57) ABSTRACT

An electric system for transmitting serial communication messages with different priorities over a communication link. The data to be transmitted is arranged in serial communication messages comprising a start of packet (SOP) symbol and data symbols. The ongoing transmission of a first message is interrupted if a SOP symbol of a second message is sent before the first message has been completed. Transmission of the first message is continued only after the second message has been sent.

16 Claims, 1 Drawing Sheet

(51) Int. Cl.
*H04L 12/413* (2006.01)
*H04L 9/40* (2022.01)

(52) U.S. Cl.
CPC ............ *H04L 12/4135* (2013.01); *H04Q 2213/13174* (2013.01); *H04Q 2213/13296* (2013.01)

(56) References Cited

U.S. PATENT DOCUMENTS

| | | | | |
|---|---|---|---|---|
| 7,228,509 | B1* | 6/2007 | Dada | G06F 30/327 716/102 |
| 7,356,756 | B1* | 4/2008 | Chan | H03M 13/356 714/781 |
| 7,719,970 | B1* | 5/2010 | Dada | H04L 12/4633 370/230 |
| 7,801,121 | B1* | 9/2010 | Van Wageningen | H04Q 11/04 370/386 |
| 2003/0214827 | A1* | 11/2003 | Ollila | H02M 7/53873 363/132 |
| 2013/0195210 | A1* | 8/2013 | Swarbrick | H04L 25/02 375/259 |
| 2015/0100711 | A1* | 4/2015 | Sengoku | H04L 12/00 710/106 |
| 2015/0156060 | A1* | 6/2015 | Ham | H04L 49/103 370/219 |
| 2015/0256580 | A1* | 9/2015 | Morton | H04N 21/64322 709/219 |
| 2016/0261375 | A1* | 9/2016 | Roethig | H04L 7/041 |
| 2017/0257233 | A1* | 9/2017 | Sung | H04L 5/0048 |
| 2017/0359195 | A1* | 12/2017 | Bender | H04L 12/403 |

FOREIGN PATENT DOCUMENTS

| | | |
|---|---|---|
| CN | 103929371 A | 7/2014 |
| CN | 104160601 A | 11/2014 |
| CN | 105339920 A | 2/2016 |
| CN | 105637495 A | 6/2016 |
| WO | 2008039567 A1 | 4/2008 |
| WO | 2013102779 A1 | 7/2013 |
| WO | 2013111010 A1 | 8/2013 |

OTHER PUBLICATIONS

International Search Report for Serial No. PCT/EP2016/082128 dated Feb. 20, 2017.

* cited by examiner

PRIORITIZED SERIAL COMMUNICATION

CROSS-REFERENCE TO RELATED APPLICATIONS

This application is a National Stage application of International Patent Application No. PCT/EP2016/082128, filed on Dec. 21, 2016, which is hereby incorporated by reference in its entirety.

TECHNICAL FIELD

The present invention relates to digital data transmission. More particularly, the invention relates to transmission of serial communication messages with different priorities.

BACKGROUND

In many electrical devices there is a need to communicate at different reaction times between the parts of the system. For example, power electronic converters such as a frequency converter generally comprises control and power parts which may have simultaneous mutual serial link communication at different priorities. E.g. status messages from the power unit can be sent at low priority, i.e. at a lower reaction time, but alarm messages related to e.g. an overshoot of the output current have to be sent as fast as possible, i.e. at high priority. The communication at different reaction times can be arranged by using an own communication channel for each speed. For cost reasons a preferable arrangement is a common channel where the lower priority messages are transmitted only after the transmission of higher priority messages first. In this arrangement the higher priority message still have to wait until the completion of the transmission of the lower priority message, which may delay a critical message too much and force to a separate channel arrangement.

A difference in the electric potential between the signal sending and receiving parts sometimes requires signal isolation e.g. by using optocouplers. The isolation increases costs and thus contributes to the advantages of arrangements with as few separate communication channels as possible.

SUMMARY

The object of the present invention is to provide a novel communication method and arrangement for an electric system having a need for a simultaneous mutual communication at different priorities between system parts. According to the invention, a common communication channel can be used for messages having different priorities, still being able to transmit the high priority messages without delay. The following is a brief summary in order to provide basic understanding of some aspects of various embodiments of the invention, a more detailed description of exemplifying embodiments are given later. The objective of the invention is achieved by what is stated in the independent claims, other preferred embodiments are disclosed in the dependent claims.

According to the present invention, messages with different priorities are sent via a common physical channel. The following protocol rules apply in the communication:

A message consists of a group of so-called symbols, like e.g. in a so-called 8b/10b line code, starting by a start of packet (SOP) symbol, followed by various number of data symbols (DATA) and ending by an end of packet (EOP) symbol. In some embodiments, the information on the number of data symbols in a message may be included in the first symbol of a message. In such case, it may be possible to omit the EOP symbol. For clarity, in order to highlight the idea of the present invention, EOP symbol is still included in the following description and figures.

The ongoing transmission of a first message is interrupted if a SOP symbol, being an indication of the start of transmission a second message, is sent before the first message has been completed.

The transmission of the first message is continued only after the second message has been completely sent, which may be indicated by an EOP symbol or by identifying that all DATA symbols have been sent.

According to the above rules, transmission the second message (corresponding a higher priority) can start any time and it is transmitted without delay completely in spite of the sending phase of the first message (corresponding a lower priority). Thus the higher priority message reserves the whole capacity of the communication channel for as long time as its transmission lasts which means that it is sent at the maximum speed permitted by the channel. The protocol rules permit also nested priorities, i.e. the SOP of a third message can interrupt sending of the second message etc.

At the transmitting end of the communication link the method according to the present invention comprises the implementation of the above protocol rules into the sent digital signal stream. At the receiving end of the communication the method further comprises recognition of different messages on the basis of received SOP symbols and EOP symbols/completed number of DATA symbols.

According to the invention, the arrangement for transmitting serial communication messages with different priority levels comprises at the transmitting end of the communication link digital logic circuit(s), capable to encode the messages according to the above data transmission protocol rules. Respectively, the arrangement at the receiving end of the communication link comprises digital logic circuit(s), capable to decode the message frames from the signal stream, encoded according to the above data transmission protocol rules. The arrangements both at the transmitting end and at the receiving end of the communication link can be based on digital logic circuit(s) with a prefixed function, e.g. a CPLD (complex programmable logic device) or they can be based on a digital logic circuit(s) with downloadable software, e.g. a programmable microprocessor.

In an arrangement based on a programmable logic, e.g. a microprocessor, the present invention comprises also a new computer program, e.g. a software package that can be downloaded to a memory device. The computer program comprises computer executable instructions for implementing the above protocol rules for transmitting prioritized serial communication messages in a common serial communication link.

The actions in related to message transmission and receiving may be included in a computer program product comprising a non-volatile computer readable medium, e.g. a compact disc "CD", encoded with a computer program according to the invention.

The invention provides a method for transmitting serial communication messages with different priorities over a communication link, wherein:

each message comprises a start of packet (SOP) symbol and a number of data symbols (DATA), the ongoing transmission of a first message is interrupted if a SOP symbol of a second message is sent before the first message has been completed, and the transmission of the first message is continued only after the second message has been transmitted.

The sending of a SOP symbol of a second message before all data symbols of the first message, indicated either by a received EOP symbol or by the counted number of data symbols, have been sent generally indicates that the first message is interrupted.

The invention also provides an apparatus for transmitting serial communication messages with different priorities over a communication link, the apparatus comprising a first control module configured to:

encode the serial communication messages such that each message comprises a start of packet (SOP) symbol and a number of data symbols (DATA), interrupt the ongoing transmission of a first message if a SOP symbol of a second message is sent before the first message has been completed, and continue the transmission of the first message only after the second message has been transmitted.

The invention yet further provides a computer program product configured to:

encode serial communication messages such that each message comprises a start of packet (SOP) symbol and a number of data symbols (DATA), interrupt the ongoing transmission of a first message if a SOP symbol of a second message is sent before the first message has been completed, and continue the transmission of the first message only after the second message has been transmitted.

The invention also provides power electronic converter (such as a frequency converter) comprising a control unit and a power unit with a serial communication link therebetween, wherein messages are sent over the serial communication link, wherein:

each message comprises a start of packet (SOP) symbol and a number of data symbols (DATA), the ongoing transmission of a first message is interrupted if a SOP symbol of a second message is sent before the first message has been completed, and the transmission of the first message is continued only after the second message has been transmitted.

The message prioritizing principle according to the present invention is beneficial by its capability in using only a single physical communication link and still being able to transmit high priority messages at the minimum reaction time enabled by the link.

The invention is best understood on the basis of the following description and accompanying drawings, comprising various exemplifying and non-limiting embodiments together with additional objects and advantages thereof.

BRIEF DESCRIPTION OF FIGURES

Below the invention appears a more detailed explanation using examples with references to the enclosed figures, wherein.

DETAILED DESCRIPTION

Figure 1:
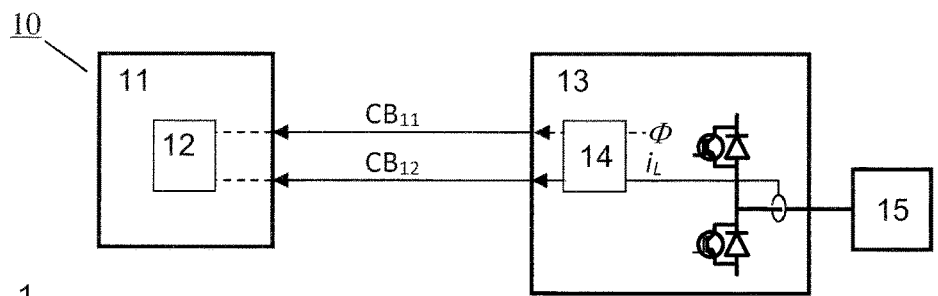
FIG. 1 presents communication channels in an electric device.

FIG. 1 presents a simplified schematic illustration of a power electronics device 10 comprising of a control unit 11, a power unit 13 and a load 15. The control unit 11 includes a controller 12, which may be e.g. a microprocessor executing a program having effect on the power electronics device 10 operation. Operation status information data will be sent by the controller 14 of the power unit 13 to the control unit, in this simplified example only a temperature $\Phi$ and an output current $i_L$ are shown. The temperature information typically is not time-critical unlike the load current, which is the reason why these measured variables are sent via different communication links $CB_{11}$, $CB_{12}$.

Figure 2:
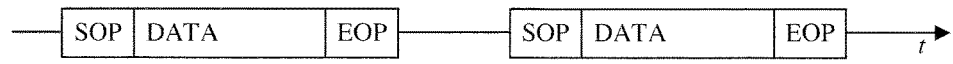
FIG. 2 illustrates a serial communication message structure.

FIG. 2 illustrates a frame of a digital data transmission message. It consists of a start of packet-symbol (SOP), a number of data symbols (DATA) and an end of packet-symbol (EOP). The number of data symbols may vary depending of the message content. Each symbol may comprise e.g. a 10 bit digital code, but in this context the number of bits in a symbol is not generally significant. In some embodiments, the information on the number of data symbols in a message may be included in the first symbol of a message. In such case, it may be possible to omit the EOP symbol. For clarity, in order to highlight the idea of the present invention, EOP symbol is generally still included in the following description and figures.

Figure 3:
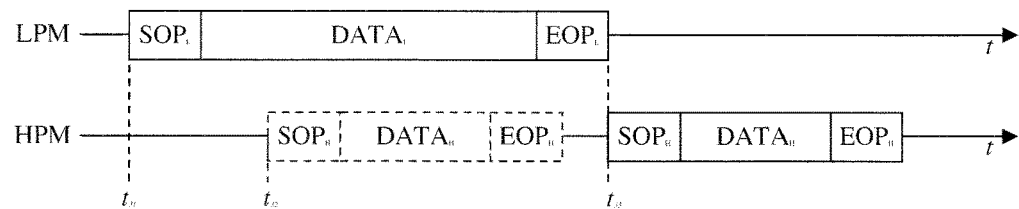
FIG. 3 illustrates sending of serial communication messages with different priorities.

FIG. 3 illustrates sending of a low priority message LPM, e.g. the thermal data $\Phi$ in FIG. 1 and a high priority message HPM, e.g. the load current data $i_L$ in FIG. 1. If the messages are sent via their own communication channels ($CB_{11}$, $CB_{12}$ in FIG. 1) the transmission can be simultaneous, i.e. sending of HPM can start at time instant $t_{32}$, while the sending of LPM is still going. But if both messages should be sent by using only one communication channel, sending of the high priority message HPM would not be able to start before time instant $t_{33}$ where the sending of LPM has finished. This is because sending of the whole message has to be completed before the sending of the following message can start, and this is the reason why time-critical messages are normally not sent in the same communication channel with low priority messages.

Figure 4:
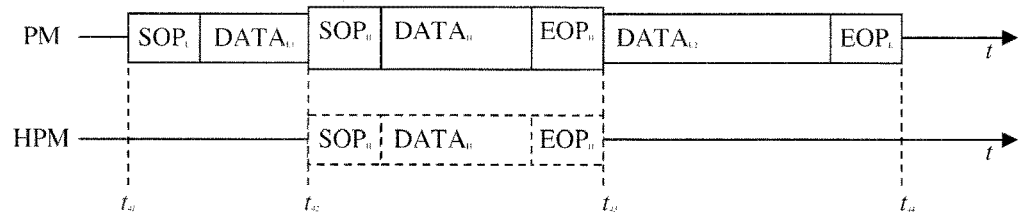
FIGS. 4 and 5 illustrate sending of serial communication messages with different priorities in a common communication channel.

FIG. 4 illustrates sending of messages with different priorities in a common communication channel PM. Here the transmission of a first message starts at time instant $t_{41}$ by sending the start of packet symbol SOPS, followed by first data symbols $DATA_{L1}$. During the transmission of the first message, the transmission of a second, higher priority message HPM needs to be started at time instant $t_{42}$. As shown in FIG. 4, the start of packet symbol $SOP_H$ of the higher priority message is sent to the receiver immediately after the next symbol boundary (an ongoing symbol transmission will not typically be interrupted), in this example also at time instant $t_{42}$. A new SOP symbol, before receiving the EOP symbol of the previous message, is interpreted at the receiving end of the communication such that the following data symbols until the next EOP symbol belong to a new message (i.e. the ongoing transmission of the lower priority message is interrupted). The rest of the new message ($DATA_H$, $EOP_H$) is now sent at one go, and its end ($EOP_H$) is a mark for the receiving end that the following symbols belong to the previous message which was interrupted at time instant $t_{42}$. Thus sending of the first message will be finished within time period from $t_{43}$ to $t_{44}$ (rest of data symbols $DATA_{L2}$ and end of packet $EOP_L$). The above example illustrates the idea of the present invention, according to which the transmission of a SOP symbol before the EOP symbol of an ongoing message transmission means that sending of a new, higher priority message is starting. In this situation the ongoing transmission of a first message is interrupted, the second higher priority message will be sent continuously at one go and after the second message's EOP symbol the transmission of the first, lower priority message can continue.

It should be noted that it is not essential to provide an EOP message in all forms of the invention. For example, if the number of bits included in the each data symbol is known, then it can be readily determined whether or not a symbol has been transmitted in its entirety without requiring an EOP message to be included. In some an arrangement, the transmission of a SOP symbol before an earlier message has been sent in its entirety indicates that a new, higher priority, message is starting.

Figure 5:
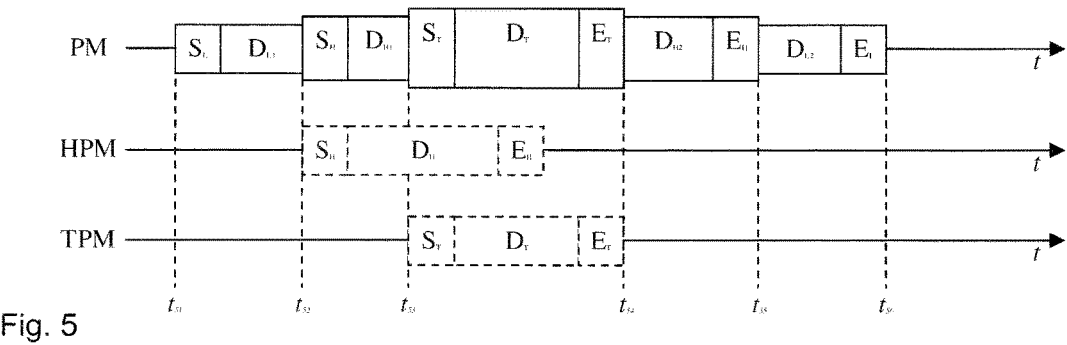

FIG. 5 illustrates an example of applying the protocol rules according to the present invention when transmitting messages at three priority levels in a common communication channel. The transmission of a first message starts at time instant $t_{51}$ by sending the start of packet symbol SL, followed by first data symbols Du. At time instant $t_{52}$ the transmission of the first message is interrupted because the transmission of a second message with higher priority reserves the communication channel by starting to send its start of packet symbol $S_H$ and first data symbols $D_{H1}$. At time instant $t_{53}$ the transmission of the second message is interrupted because the transmission of a third message with still higher priority reserves the communication channel by sending its start of packet symbol $S_T$. After the transmission of the highest priority message (start of packet symbol $S_T$, data symbols $D_T$, end of packet symbol $E_T$) has been completed at time instant $t_{54}$, the transmission of the rest of the second message (rest of data symbols $D_{H2}$, end of packet symbol $E_H$) can start. And after the completion of the transmission of the second message at time instant $t_{55}$, the transmission of the rest of the interrupted first message can start ($D_{L2}$, $E_L$).

As can be seen in this example of FIG. 5, the same protocol rules according to the invention work by arbitrary number of nested priority levels. Always the highest priority level message, recognized from the last received SOP symbol, will be transmitted after the next symbol boundary, and the transmission of the next lower level priority messages will be finalized in order of priority.

The specific examples provided in the description above are not exhaustive unless otherwise explicitly stated, nor should they be construed as limiting the scope and/or the applicability of the accompanied claims. The features recited in the accompanied dependent claims are mutually freely combinable unless otherwise explicitly stated. The verbs "to comprise" and "to include" are used in this document as open limitations that neither exclude nor require the existence of also un-recited features. Furthermore, it is to be understood that the use of "a" or "an", i.e. a singular form, throughout this document does not exclude a plurality.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for transmitting serial communication messages with different priorities over a communication link, comprising:
   enabling each message to comprise a start of packet (SOP) symbol and a plurality of data symbols,
   interrupting transmission of a first message if the SOP symbol of a second message is sent before the first message has been completed, and
   continuing the transmission of the first message from a point where the first message was interrupted only after the second message has been transmitted,
   wherein:
   the transmission of the second message is interrupted if the SOP symbol of a third message is sent before the second message has been completed,
   the transmission of the second message is continued only after the third message has been completely transmitted,
   the third message has higher priority than the second message, and the second message has higher priority than the first message,
   each symbol of each of the serial communication messages comprises a predefined number of bits, and
   the serial communication messages are encoded such that information on the plurality of data symbols in a message is included in a first symbol of the message, wherein the first symbol is part of the plurality of data symbols, and wherein the plurality of data symbols follow the SOP symbol.

2. The method according to claim 1, wherein the each message comprises an end of packet (EOP) symbol.

3. The method according to claim 1, wherein the transmission of the first message is continued only after the second message has been transmitted in its entirety.

4. The method according to claim 1, wherein, at a signal receiving end of the communication link, data symbols of the first message sent before the first message was interrupted by the second message and data symbols of the first message sent after the first message was interrupted by the second message are reconstructed into a single message.

5. The method according to claim 1, wherein the first message and the second message are transmitted over a single physical communication link.

6. The method according to claim 1, wherein each symbol of the each message is in 8b/10b line code.

7. An apparatus for transmitting serial communication messages with different priorities over a communication link, the apparatus comprising a first processor configured to:
   encode the serial communication messages such that each message comprises a start of packet (SOP) symbol and a plurality of data symbols,
   interrupt transmission of a first message if the SOP symbol of a second message is sent before the first message has been completed, and
   continue the transmission of the first message from a point where the first message was interrupted only after the second message has been transmitted,
   wherein:
   the transmission of the second message is interrupted if the SOP symbol of a third message is sent before the second message has been completed,
   the transmission of the second message is continued only after the third message has been completely transmitted,
   the third message has higher priority than the second message, and the second message has higher priority than the first message,
   each symbol of each of the serial communication messages comprises a predefined number of bits, and
   the serial communication messages are encoded such that information on the plurality of data symbols in a message is included in a first symbol of the message, wherein the first symbol is part of the plurality of data symbols, and wherein the plurality of data symbols follow the SOP symbol.

8. The apparatus as claimed in claim 7, the apparatus being further configured to encode the serial communication messages such that the each message comprises an end of packet (EOP) symbol.

9. The apparatus according to claim 7, the apparatus further comprising a second processor configured to reconstruct data symbols of the first message sent before the first message was interrupted by the second message and data symbols of the first message sent after the first message was interrupted by the second message into a single message.

10. The apparatus according to claim 7, wherein the first processor has a predefined function.

11. The apparatus according to claim 7, wherein operation of the first processor is based on a downloadable software.

12. The apparatus according to claim 7, the apparatus is a power electronic converter.

13. The apparatus according to claim 7, wherein the first message and the second message are transmitted over a single physical communication link.

14. The apparatus according to claim 7, wherein each symbol of the each message is in 8b/10b line code.

15. A computer program product comprising a non-transitory computer readable medium encoded with a computer program configured to implement a method of:
encoding serial communication messages such that each message comprises a start of packet (SOP) symbol and a plurality of data symbols,
interrupting transmission of a first message if the SOP symbol of a second message is sent before the first message has been completed, and
continuing the transmission of the first message from a point where the first message was interrupted only after the second message has been transmitted,
wherein:
the transmission of the second message is interrupted if the SOP symbol of a third message is sent before the second message has been completed,
the transmission of the second message is continued only after the third message has been completely transmitted,
the third message has higher priority than the second message, and the second message has higher priority than the first message,
each symbol of each of the serial communication messages comprises a predefined number of bits, and
the serial communication messages are encoded such that information on the plurality of data symbols in a message is included in a first symbol of the message, wherein the first symbol is part of the plurality of data symbols, and wherein the plurality of data symbols follow the SOP symbol.

16. The computer program product according to claim 15, wherein the first message and the second message are transmitted over a single physical communication link.

* * * * *